US012656469B1

(12) United States Patent
Tsang et al.

(10) Patent No.: US 12,656,469 B1
(45) Date of Patent: Jun. 16, 2026

(54) ULTRASONIC-ECHO ENVELOPE DETECTION WITH SHARED FINITE-IMPULSE-RESPONSE (FIR)/HILBERT MULTIPLIER

(71) Applicant: Hong Kong Applied Science and Technology Research Institute Company Limited, Hong Kong (HK)

(72) Inventors: Eric Kwong Hang Tsang, Hong Kong (HK); Nok In Loi, Hong Kong (HK); Jingwei Xie, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 19/092,188

(22) Filed: Mar. 27, 2025

(51) Int. Cl.
| | |
|---|---|
| *G01S 7/53* | (2006.01) |
| *G01S 7/527* | (2006.01) |
| *G01S 7/539* | (2006.01) |

(52) U.S. Cl.
CPC .......... *G01S 7/5273* (2013.01); *G01S 7/5276* (2013.01); *G01S 7/53* (2013.01); *G01S 7/539* (2013.01)

(58) Field of Classification Search
CPC ........ G01S 7/5273; G01S 7/5276; G01S 7/53; G01S 7/539
See application file for complete search history.

(56) References Cited

U.S. PATENT DOCUMENTS

| | | | |
|---|---|---|---|
| 6,909,668 | B2 | 6/2005 | Baldwin et al. |
| 7,024,447 | B2 | 4/2006 | Pisati et al. |
| 8,021,302 | B2 | 9/2011 | Sato |
| 9,506,896 | B2 | 11/2016 | Hwang et al. |
| 11,054,520 | B2 | 7/2021 | Zhu et al. |
| 2009/0299184 | A1 | 12/2009 | Walker et al. |
| 2014/0107950 | A1 | 4/2014 | Dabak et al. |
| 2021/0018350 | A1 | 1/2021 | Sathyanarayana et al. |

(Continued)

FOREIGN PATENT DOCUMENTS

| | | |
|---|---|---|
| CN | 108871812 A | 11/2018 |
| CN | 110231548 A | 9/2019 |

(Continued)

OTHER PUBLICATIONS

ISR and Written Opinion, PCT/CN2025/086082, Dec. 23, 2025.
Morse & Fleshbach, "Methods of Theoretical Physics", McGraw Hill Book Co, 1953, Chapters 4, 8.

*Primary Examiner* — Abdallah Abulaban
(74) *Attorney, Agent, or Firm* — Stuart T. Auvinen; gPatent LLC

(57) ABSTRACT

An ultrasonic echo envelope detector has an analytic transformer receiving a digitized ultrasonic echo waveform that performs a band pass Finite-Impulse-Response (FIR) filter and a Hilbert transform to generate inline and quadrature outputs for a detected envelope. The analytic transformer has three FIR units and one muxed Hilbert/FIR unit, each with N taps, for a 4N-tap FIR filter. Each unit has a shared multiplier that selects one of the N taps to multiply with a coefficient. Products are summed by a band pass filter accumulator. After all N taps are processed, the accumulator output is shifted in to another N Hilbert taps in the muxed Hilbert/FIR unit. Each of the N Hilbert taps is multiplied by a corresponding Hilbert coefficient and accumulated. The middle Hilbert tap is delayed and output as the inline output while the Hilbert accumulator value is output as the quadrature output.

20 Claims, 14 Drawing Sheets

(56)        References Cited

U.S. PATENT DOCUMENTS

2024/0133721 A1    4/2024  Kantor et al.
2024/0329240 A1    10/2024  Takamura et al.

FOREIGN PATENT DOCUMENTS

CN         110998363  B      7/2023
CN         109307858  B      9/2023
CN         117111001  A     11/2023

ULTRASONIC-ECHO ENVELOPE DETECTION WITH SHARED FINITE-IMPULSE-RESPONSE (FIR)/HILBERT MULTIPLIER

FIELD OF THE INVENTION

This invention relates to envelope detectors, and more particularly to ultrasonic echo envelope detection using reconfigurable Finite-Impulse-Response (FIR) and Hilbert filter stages.

BACKGROUND OF THE INVENTION

A variety of sophisticated electronics have been embedded in moving vehicles such as passenger cars. The driving experience and safety can be improved by electronic driver assist features. Driver assistance features often include collision alert and parking assistance.

FIGS. 1A-1B highlight operation of a parking assistance system using ultrasonic echo detection. In FIG. 1A, car 10 is backing up toward object 18, which could be a curb or barrier at the back of a parking spot. Transducer 12 in car 10 transmits ultrasonic waves that reflect off object 18. FIG. 1B shows the echo or return pulses of the ultrasonic waves that are reflected from object 18 back toward car 10. Transducer 12 on car 10 receives these reflected ultrasonic waves, which are processed to determine the distance from car 10 to object 18.

For collision alert systems, transducers 12 could be located at several positions on car 10, such as on all four sides. Object 18 could be a moving object such as another car. The change in distance over time could be used to detect a possible collision when both car 10 and object 18 are moving. An audible alert can be given to the driver when the distance between car 10 and object 18 is below a threshold and decreasing.

FIGS. 2A-2B show prior-art quadrature envelope detection. Many automobile parking assist systems process the received ultrasonic echo using quadrature envelope detection. FIG. 2A shows a graph of the received ultrasonic echo signal that is detected by transducer 12 (FIG. 1B) after being reflected off of object 18. Received ultrasonic echo signal 22 has a frequency in the ultrasonic range, but has a magnitude that varies with received pulses. Transducer 12 may vary the transmit power or magnitude of the ultrasonic waves, thus sending out pulses of the ultrasonic waves rather than a continuous constant-magnitude signal. These pulses then reflect off object 18, causing the magnitude of ultrasonic echo signal 22 to vary. A low-pass filter can then remove the high-frequency component of ultrasonic echo signal 22, leaving envelope signal 24 that connects the signal peaks. In FIG. 2B, envelope signal 24 is output by an envelope detector.

FIG. 3 shows a prior-art envelope detector. Ultrasonic echo signal 22 is input as the UT input to cosine unit 30 and to sine unit 32. Cosine unit 30 generates the cosine of ultrasonic echo signal 22 and outputs In-phase signal I. Sine unit 32 generates the sine of ultrasonic echo signal 22 and outputs Quadrature signal Q. Absolute value generator 26 sums the square of in-phase signal I and the square of quadrature signal Q, and then outputs the square root of this sum. Low pass filter 28 then removes the high-frequency components to output the envelope signal (FIG. 2B, 24).

While quadrature envelope detection is useful, sine and cosine functions are complex and expensive to implement. Both the phase and the magnitude may be used by some systems, increasing complexity and cost. Some detectors may use the frequency domain rather than the time domain, resulting in more complexity and cost.

What is desired is an envelope detector for detecting ultrasonic echo. An envelope detector that does not use complex functions such as sine and cosine is desirable. An ultrasonic echo envelope detector using an analytic transform that implements FIR and Hilbert filtering is desired to eliminate a separate low-pass filter. Reconfigurable hardware is desired that allows parameters to be reconfigured on-the-fly is desired to allows the FIR filter hardware to be re-used for both bandpass and Hilbert filtering.

DETAILED DESCRIPTION

The present invention relates to an improvement in ultrasonic echo envelope detection. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
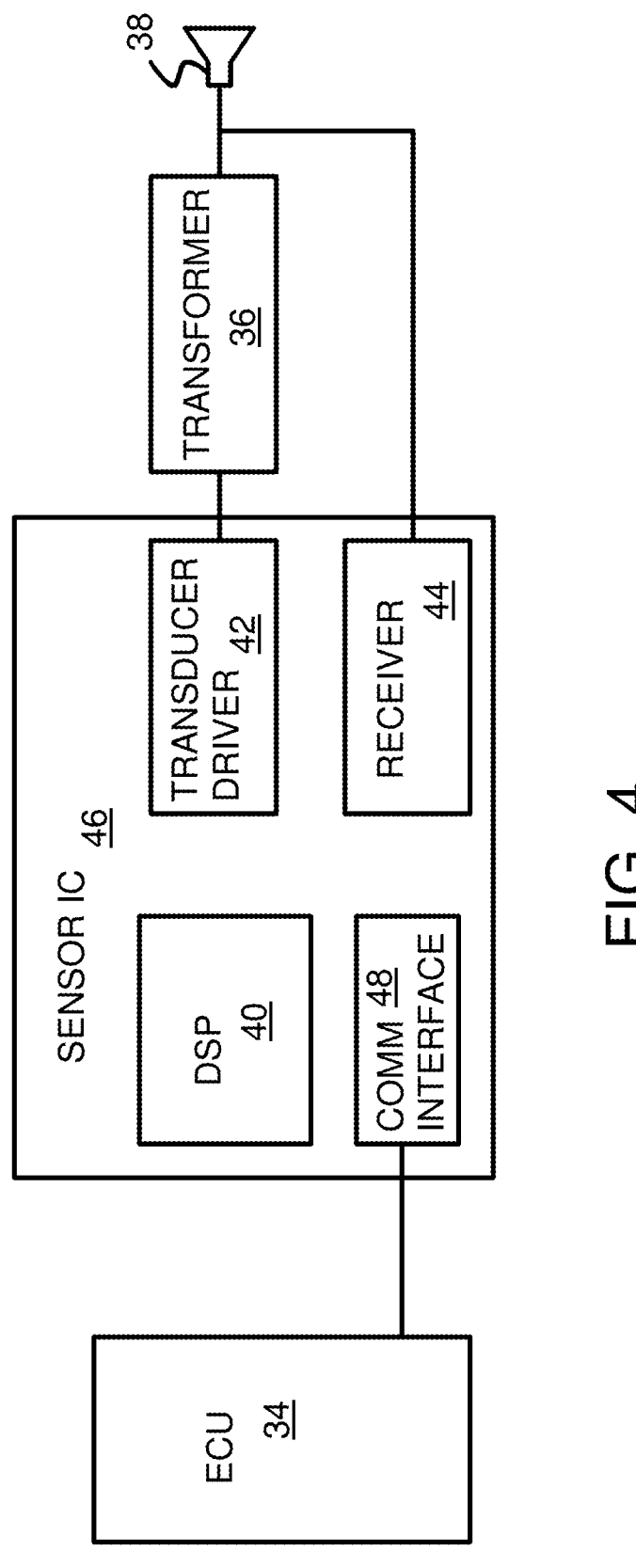
FIG. 4 shows an ultrasonic echo sensing system.

FIG. 4 shows an ultrasonic echo sensing system. The vehicle has one or more Electronic Control Unit (ECU) 34 that may control various operations in the vehicle. One function of ECU 34 is to control sensor chip 46 to implement parking assist.

Figures 1A, 1B:
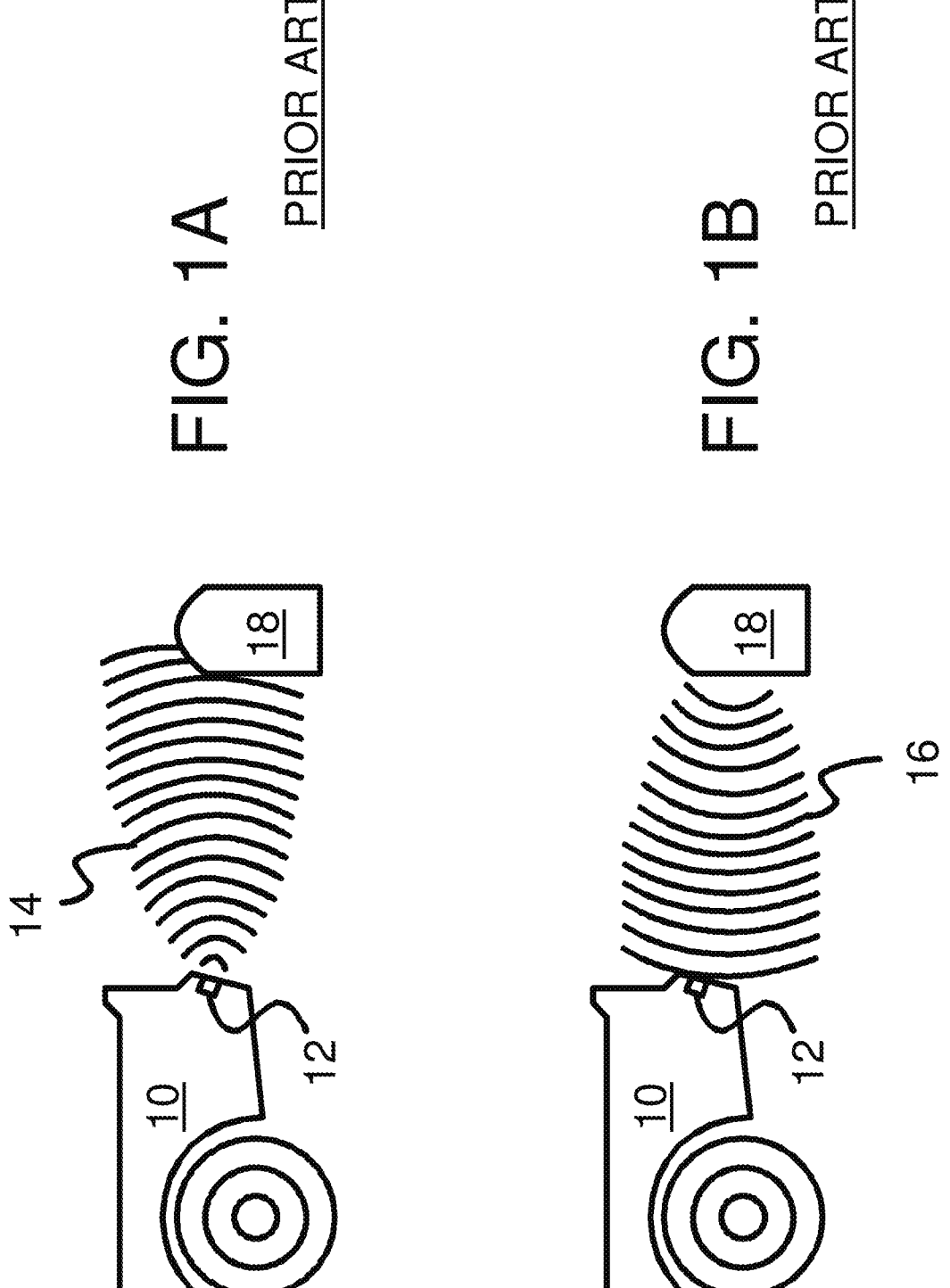
FIGS. 1A-1B highlight operation of a parking assistance system using ultrasonic echo detection.
Figures 2A, 2B:
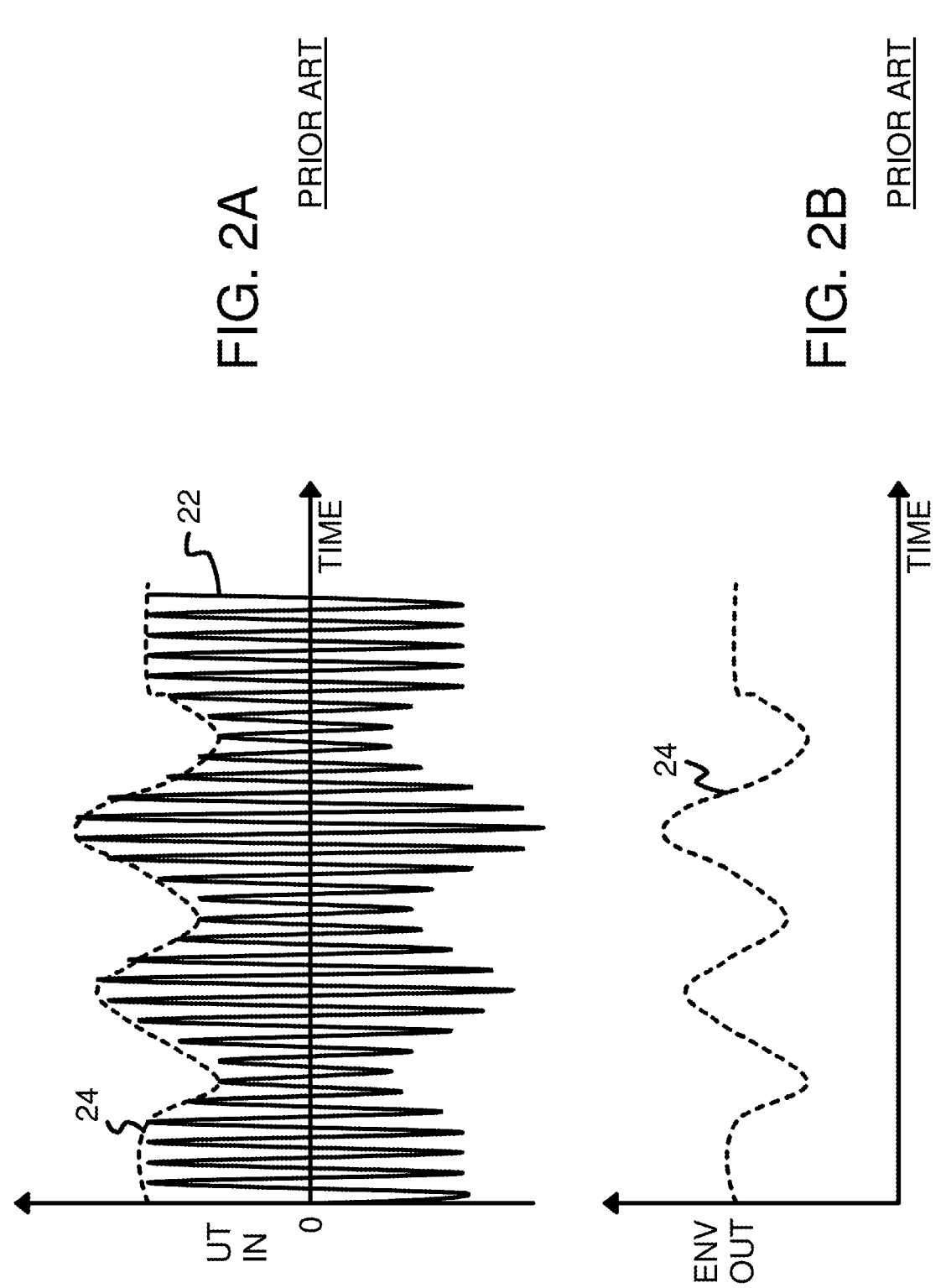
FIGS. 2A-2B show prior-art quadrature envelope detection.

Sensor chip 46 is an Integrated Circuit (IC) that sends data to and receives commands and data from ECU 34 using communication interface 48. Commands can include activating transducer driver 42 to generate ultrasonic wave signals that are coupled to antenna 38 through transformer 36. Some of these ultrasonic wave signals are reflected back by object 18 (FIG. 1B) to antenna 38 and detected by receiver 44.

Digital Signal Processor (DSP) 40 can process the received signals from receiver 44 to detect envelopes. The magnitude of the envelope is influenced by the material in the object reflecting the ultrasonic waves, while the arrival time of the echo can be used to calculate or estimate the distance from car 10 to object 18.

Figure 5A:
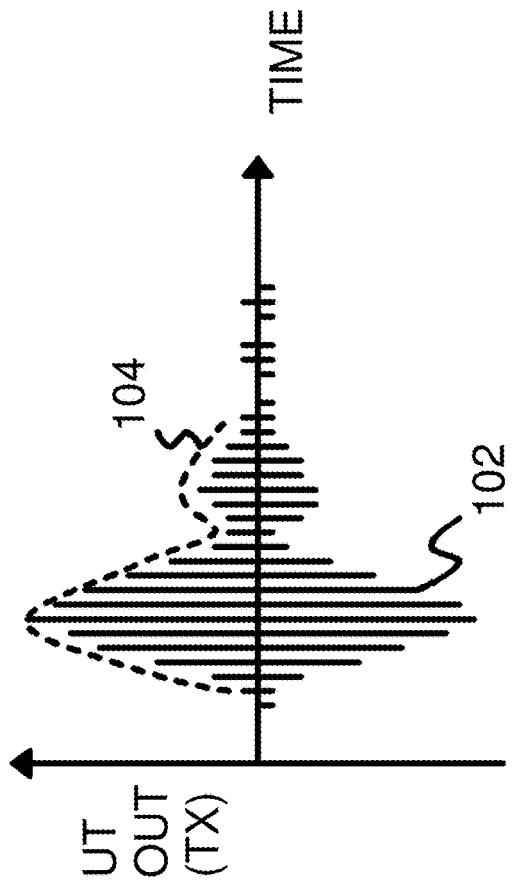
FIGS. 5A-5B show transmitted and received ultrasonic signals.
Figure 5B:
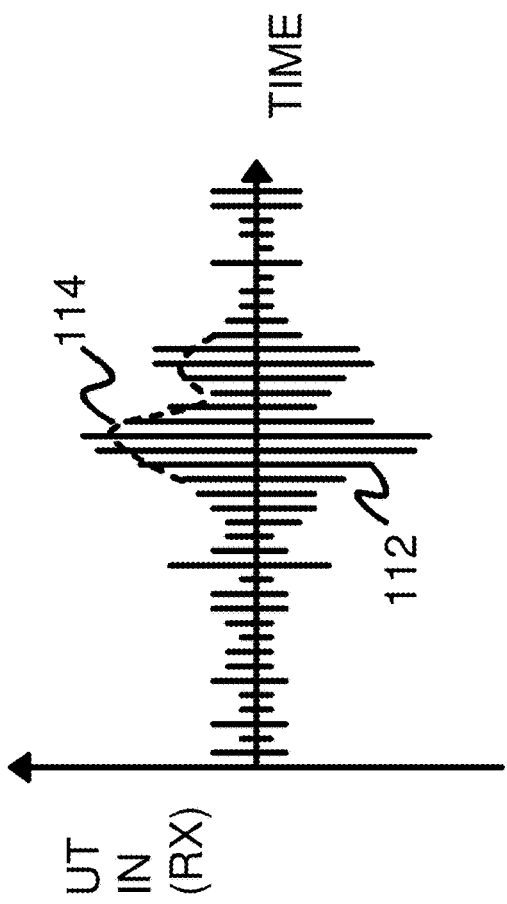

FIGS. 5A-5B show transmitted and received ultrasonic signals. In FIG. 5A, transducer driver 42 causes antenna 38 to transmit ultrasonic waves 102. Rather than transmit at a continuous constant power, the transmit power of transducer driver 42 is varied to form pulses at distinct times. In FIG. 5A, transducer driver 42 generates a higher-magnitude pulse followed by a smaller pulse. This pulse train of ultrasonic waves is transmitted and then reflected by object 18 (FIG. 1). The reflected ultrasonic echo is received by antenna 38 (FIG. 4) and amplified by receiver 44 to generate ultrasonic echo 112, shown in FIG. 5B.

The ultrasonic echo envelope detector can then process ultrasonic echo 112 to remove high-frequency components to generate detected envelope 114. Note that the large-magnitude peak of ultrasonic echo 112 (FIG. 5B) occurs some time after the large-magnitude peak of transmitted ultrasonic waves 102 (FIG. 5A). This time delay or time difference between transmitted and received peaks can be multiplied by the speed of sound and divided by 2 to generate the distance between the car and object.

Figure 6:
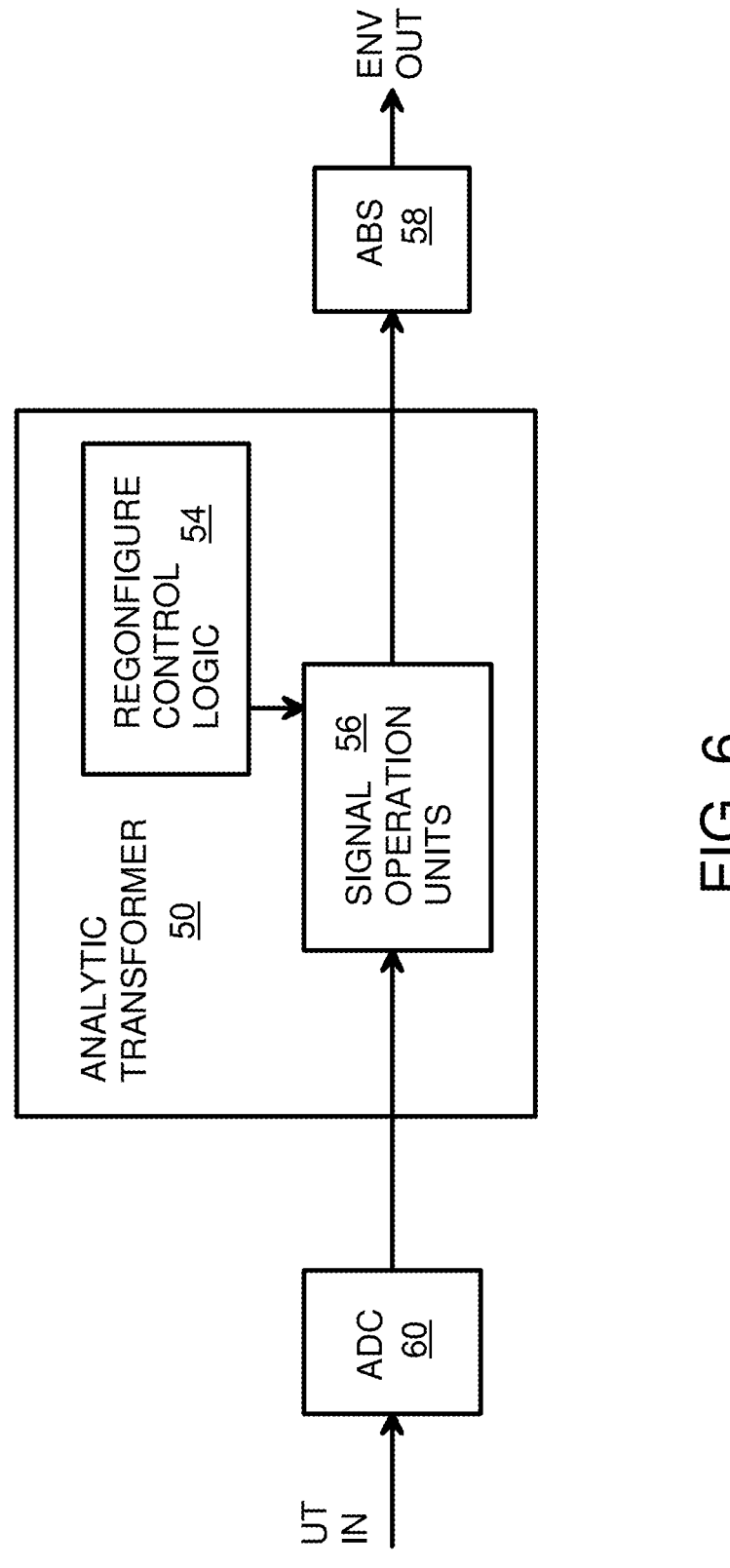
FIG. 6 shows an ultrasonic echo envelope detector implemented in by an analytic transformer.

FIG. 6 shows an ultrasonic echo envelope detector implemented in by an analytic transformer. Analytic transformer 50 can replace DSP 40 or can be a part of or an extension of DSP 40 (FIG. 4). Analytic transformer 50 includes signal operation units 56 that are reconfigured using reconfigure control logic 54. Analytic transformer 50 uses signal operation units 56 to perform a single transform of ultrasonic echo 112 (FIG. 5B) to generate detected envelope 114. Reconfigure control logic 54 controls signal operation units 56 to perform both FIR bandpass filtering and Hilbert filtering as part of this single transform.

Analog-to-Digital Controller (ADC) 60 converts the analog signal from receiver 44 (UT IN) to a stream of digital values. These digital values are processed by analytic transformer 50 to generate In-phase and quadrature outputs that are squared, summed, and the square root taken by absolute unit 58 to generate the envelope output ENV OUT, which is detected envelope 114 (FIG. 5B).

Figure 7B:
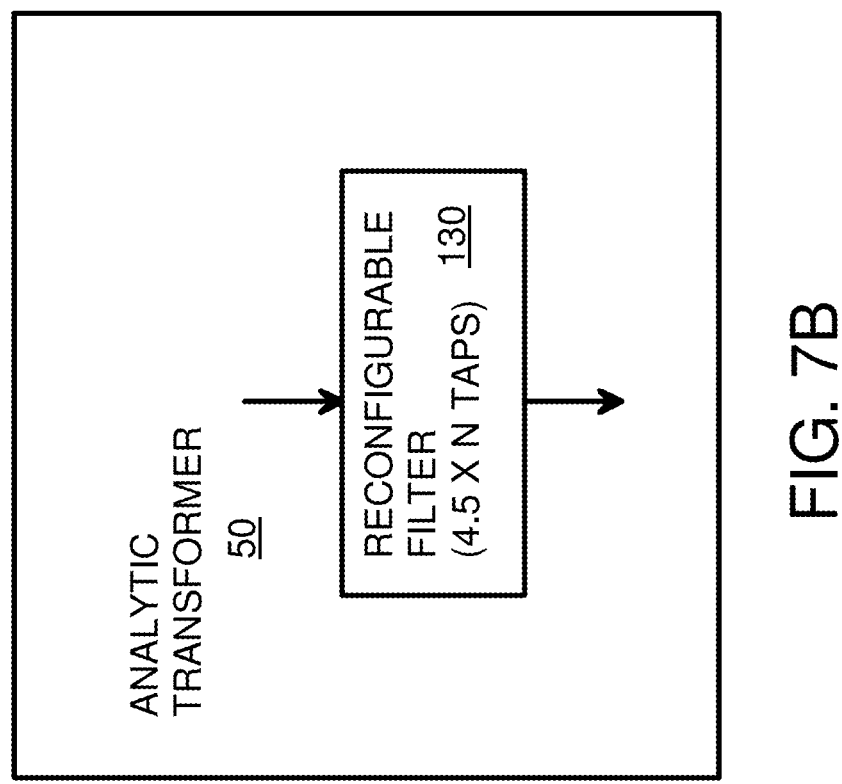
FIGS. 7A-7B highlight a single transform that replaces a band-pass filter, a Hilbert filter, and a low-pass filter.
Figure 7A:
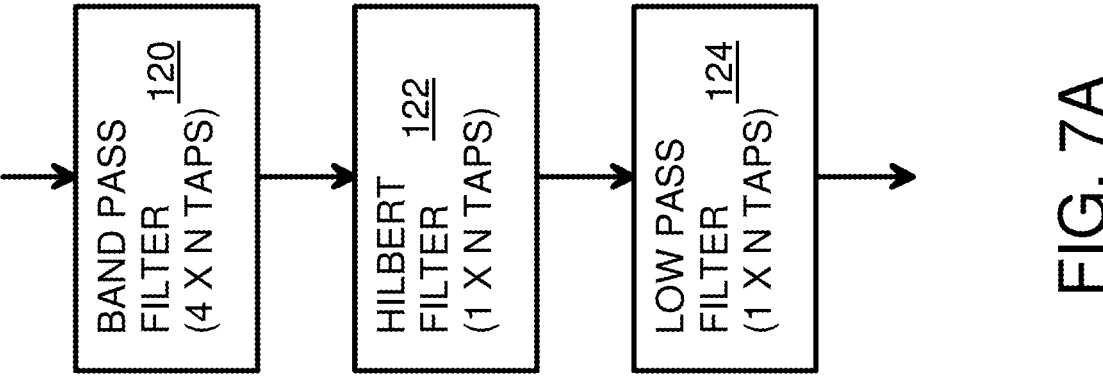

FIGS. 7A-7B highlight a single transform that replaces a band-pass filter, a Hilbert filter, and a low-pass filter. In FIG. 7A, a DSP could perform 3 filtering operating on the ultrasonic echo to generate the detected envelope. The ultrasonic echo input is first applied to band pass filter 120, which has 4×N taps. Then the band-pass filter output is applied as the input to Hilbert filter 122, which has N taps. Then the Hilbert filter output is applied as the input to low-pass filter 124, which also has N taps. The output of low-pass filter 124 is the detected envelope.

Rather than have 3 distinct filters, as shown in FIG. 7A, the inventors perform a single transform using analytic transformer 50, as shown in FIG. 7B. There is no low pass filter 124. Instead, analytic transformer 50 uses reconfigurable filter 130 to perform one transform operation on the ultrasonic echo input, with the result being the detected envelope.

Reconfigurable filter 130 multiplexes band pass and Hilbert coefficients and taps, allowing the same hardware units to perform both FIR and Hilbert filtering.

Having 3 separate filters would require 4N+N+N=6N taps (FIG. 7A), while using analytic transformer 50 requires only 4.5N taps. The number of taps is reduced by 25%. Thus the area required for the hardware to implement reconfigurable filter 130 is about 25% smaller than the area required to implement filters 120, 122, 124. Thus area, cost, and power can be reduced by about 25%.

Figure 8:
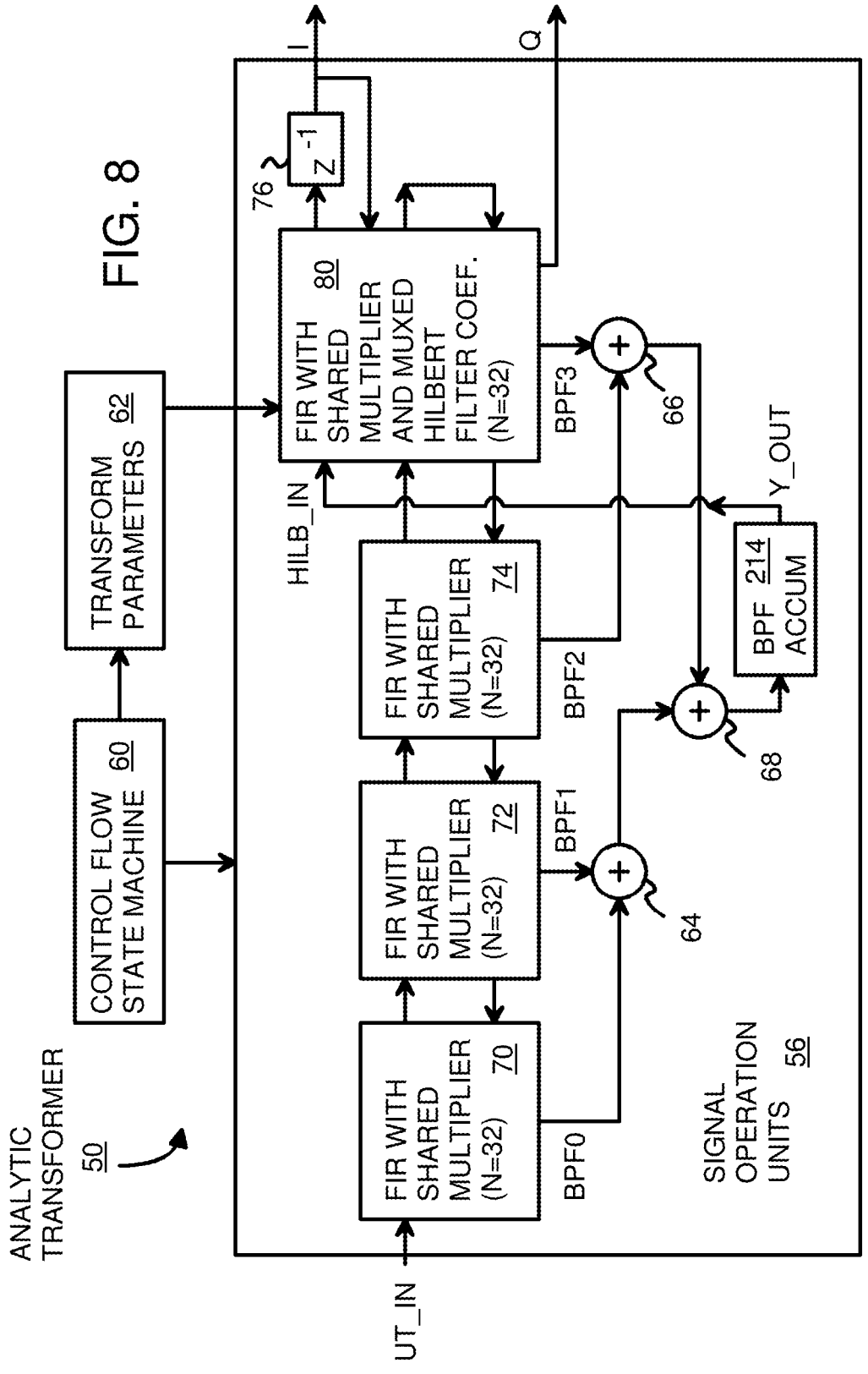
FIG. 8 is a block diagram of the analytic transformer in more detail.

FIG. 8 is a block diagram of the analytic transformer in more detail. Analytic transformer 50 is controlled by control flow state machine 60 that causes transform parameters 62 to be read from a register or memory and sent to signal operation units 56. Transform parameters 62 include FIR filter coefficients that are sent to FIR units 70, 72, 74 and to muxed Hilbert/FIR unit 80. Transform parameters 62 also include Hilbert filter coefficients that are sent to muxed Hilbert/FIR unit 80.

FIR units 70, 72, 74 each have N taps or registers that can store N time points. Each FIR unit 70, 72, 74 has N/2 registers for forward shifting to the right, and N/2 registers for reverse or backward shifting to the left.

Signal magnitude values for each time point of the ultrasonic echo input UT_IN (FIG. 5B) are shifted into the first FIR unit 70. After N/2 pulses of an input clock, the last (right-most) value in first FIR unit 70 is shifted into the first (left-most) tap register in second FIR unit 72. Echo signal values are right-shifted through FIR units 70, 72, 74, and then after 3*N/2 input clocks, are shifted into muxed Hilbert/FIR unit 80. After 2N input clocks, the last tap register value in the forward path of muxed Hilbert/FIR unit 80 is fed back to the first (right-most) tap register in the reverse path of muxed Hilbert/FIR unit 80. This value is left-shifted until reaching the left-most tap register of first FIR unit 70, after a total of 4N-1 input clocks, when all 4N-1 tap registers before performing or starting any multiply operations.

Each of the N tap register values in FIR unit 70 is multiplied by a FIR coefficient from transform parameters 62 before the input clock changes and another new time point value is shifted in. While N multipliers could be used in parallel, a single shared multiplier is used by FIR unit 70 and shared among the N tap values. The N results of the coefficient and tap value multiply are accumulated in band pass filter accumulator 214.

Likewise, FIR units 72, 74 and muxed Hilbert/FIR unit 80 also share one multiplier per unit. One of the N tap registers is selected and multiplied by its coefficient for each accumulator clock pulse. The multiply result or product from FIR unit 70 is output as BPF0, while the multiply result from FIR units 72, 74 are output as BPF1, BPF2, respectively. The multiply result from muxed Hilbert/FIR unit 80 is output as BPF3.

Adder 64 sums the multiply results BPF0 from FIR unit 70 and BPF1 output from FIR unit 72. Adder 66 sums the multiply results BPF2 from FIR unit 74 and BPF3 output from muxed Hilbert/FIR unit 80. Final adder 68 adds the sums generated by adders 64, 66 to drive a sum of BPF0, BPF1, BPF2, and BPF3 into band pass filter accumulator 214.

Each pulse of the accumulator clock causes band pass filter accumulator 214 to accumulate another summed multiply result from final adder 68 into the accumulated sum, Y_OUT. After N accumulator clock cycles, all N taps from each of FIR units 70, 72, 74, and muxed Hilbert/FIR unit 80 have been accumulated, and the final accumulated value is the FIR band-pass filter output Y_OUT for that input clock cycle. The input clock then shifts this final band-pass filter value Y_OUT in to the first tap register of the Hilbert filter, HILB_IN.

muxed Hilbert/FIR unit 80 contains two sets of N tap registers, one for the band pass FIR filter, and a second for the Hilbert filter. muxed Hilbert/FIR unit 80 uses a first set of N tap registers for the FIR filter when FIR units 70, 72, 74 are multiplying band-pass coefficients and band pass filter accumulator 214 is accumulating the results.

After the final band-pass filter accumulated value Y_OUT is generated and shifted into the left-most of the N tap registers for the Hilbert filter in muxed Hilbert/FIR unit 80, then the second set of N tap registers for the Hilbert filter are selected, one at a time, for multiplying by the Hilbert filter coefficients. The products are accumulated in a second accumulator that is inside muxed Hilbert/FIR unit 80, Hilbert accumulator 224 (FIG. 9).

Delay stage 76 is an additional tap register that stores the symmetric center value of the Hilbert filter before being fed back into the reverse path of the Hilbert filter in muxed Hilbert/FIR unit 80. The FIR feedback from muxed Hilbert/FIR unit 80 does not have this additional delay stage.

The output of delay stage 76 is the In-line (I) output. The Quadrature Q output is the accumulated value in Hilbert accumulator 224 (FIG. 9). These I and Q outputs are squared, summed, and the square root taken by absolute unit 58 (FIG. 6) to get the final envelope value for this time point.

Figure 9:
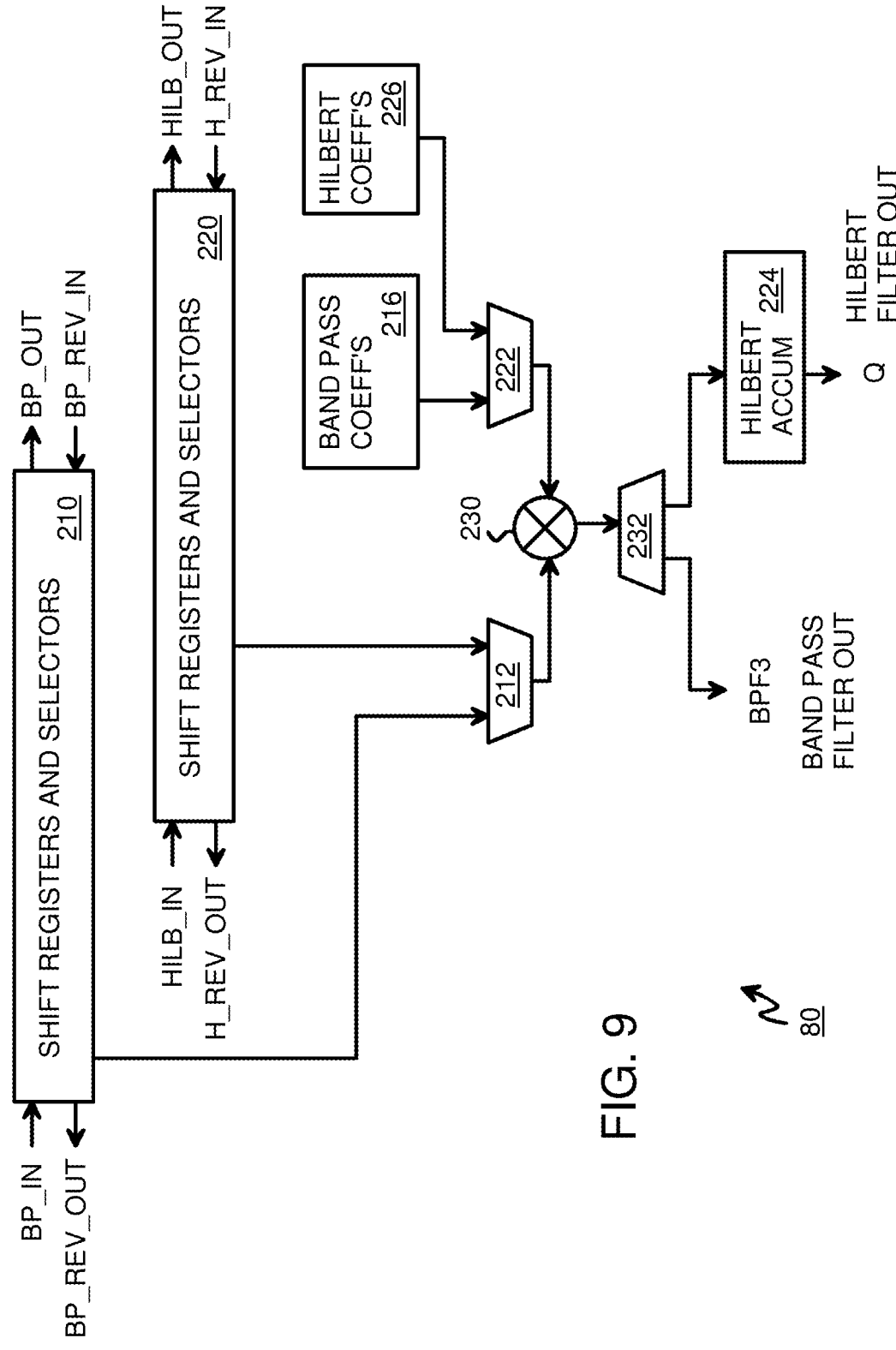
FIG. 9 is a diagram of the muxed Hilbert/FIR unit.

FIG. 9 is a diagram of the muxed Hilbert/FIR unit. muxed Hilbert/FIR unit 80 has a first set of N tap registers for the band pass FIR filter, band pass taps 210. There are N/2 registers in the forward path, from BP_IN to BP_OUT, and another N/2 registers in the reverse path, from BP_REV_IN to BP_REV_OUT. Since muxed Hilbert/FIR unit 80 is the final (right-most) part of the overall band pass FIR filter, its output is fed back to its input, so BP_OUT is connected to BP_REV_IN. BP_IN is connected to BP_OUT of prior FIR unit 74, while BP_REV_OUT drives BP_REV_IN of prior FIR unit 74.

muxed Hilbert/FIR unit 80 has a second set of N tap registers for the Hilbert filter, Hilbert taps 220. There are N/2 registers in the forward path, from HILB_IN to HILB_OUT, and another N/2 registers in the reverse path, from HILB_REV_IN to HILB_REV_OUT. HILB_IN receives Y_OUT from band pass filter accumulator 214. HILB_OUT drives delay stage 76 (FIG. 8) that drives feedback to HILB_REV_IN after a one input clock delay.

When the band pass FIR filter is accumulating, mux 212 selects one of the N tap register values from band pass taps 210, which is then multiplied by a corresponding one of band pass coefficients 216 selected by mux 222. The product from multiplier 230 is then routed by demux 232 to the band pass output BPF3. BPF3 is then summed with BPF0-2 by adders 64, 66, 68 and accumulated by band pass filter accumulator 214 (FIG. 8).

When the Hilbert filter is accumulating, mux 212 selects one of the N tap register values from Hilbert taps 220, which is then multiplied by a corresponding one of Hilbert coefficients 226 selected by mux 222. The product from multiplier 230 is then routed by demux 232 to Hilbert accumulator 224, which accumulates the Hilbert products for all N taps in Hilbert taps 220. The final accumulated value of Hilbert accumulator 224 is the Quadrature output Q of the Hilbert filter.

Thus muxed Hilbert/FIR unit 80 uses the same shared multiplier 230 for band pass FIR filtering and for Hilbert filtering. For each new time point value of the ultrasonic echo input (ultrasonic echo 112, FIG. 5B), FIR units 70, 72, 74 and muxed Hilbert/FIR unit 80 act as a FIR filter with 4N taps to generate an output Y_OUT for that time point. Then muxed Hilbert/FIR unit 80 acts as an N-tap Hilbert filter on the last N FIR filter outputs to generate I and Q components of the envelope waveform (detected envelope 114, FIG. 5B).

Figure 10:
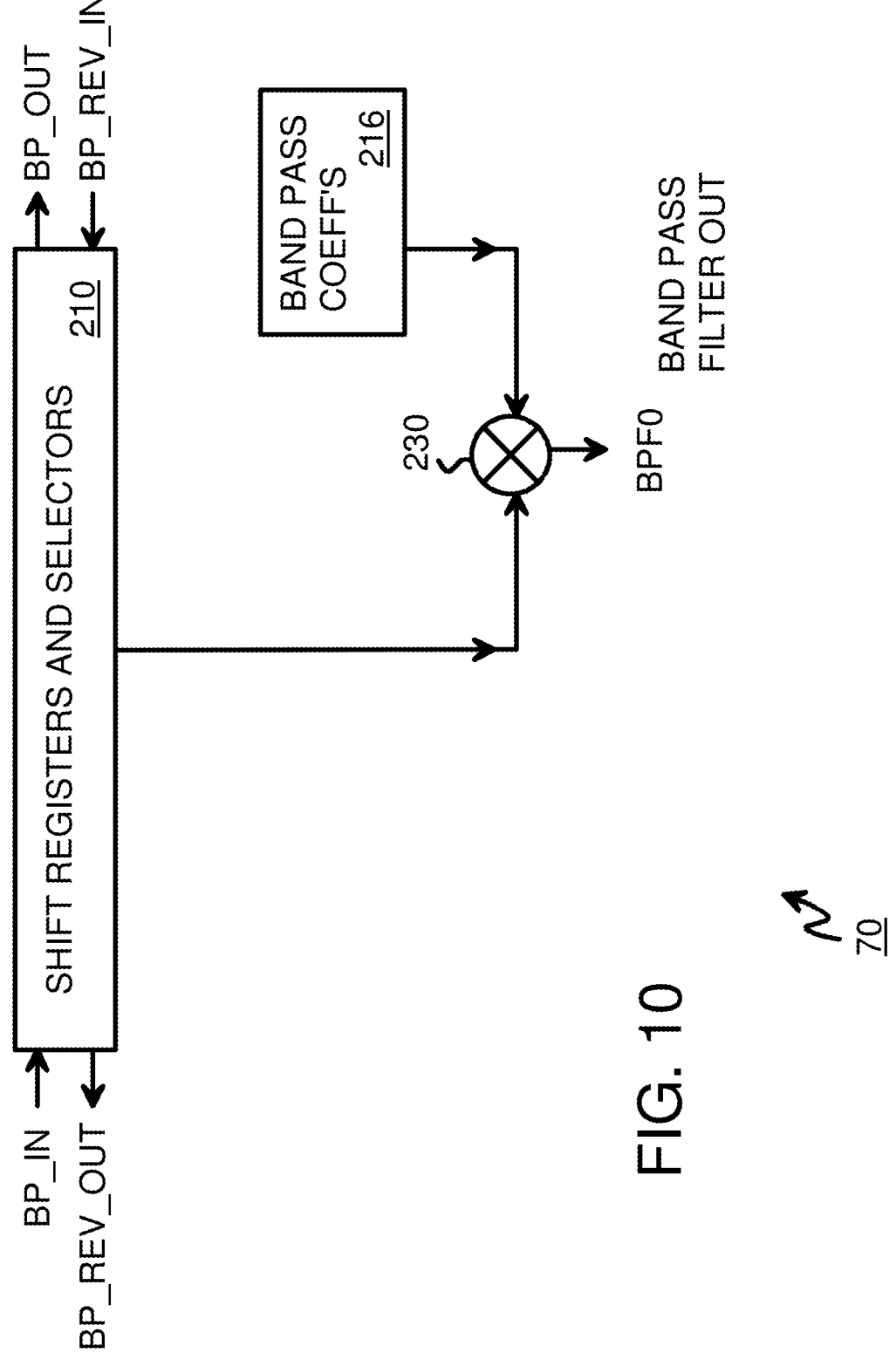
FIG. 10 is a diagram of the FIR unit.

FIG. 10 is a diagram of the FIR unit. FIR unit 70 has one set of N tap registers for the band pass FIR filter, band pass taps 210. There are N/2 registers in the forward path, from BP_IN to BP_OUT, and another N/2 registers in the reverse path, from BP_REV_IN to BP_REV_OUT.

For FIR unit 70, BP_IN receives the ultrasonic echo input, UT_IN, which is ultrasonic echo 112 waveform of FIG. 5B. BP_OUT drives BP_IN of next FIR unit 72, while BP_REV_IN is driven by BP_REV_OUT of next FIR unit 72.

For FIR unit 72, BP_IN is connected to BP_OUT of prior FIR unit 70, while BP_REV_OUT drives BP_REV_IN of prior FIR unit 70. BP_OUT drives BP_IN of next FIR unit 74, while BP_REV_IN is driven by BP_REV_OUT of next FIR unit 74.

For FIR unit 74, BP_IN is connected to BP_OUT of prior FIR unit 72, while BP_REV_OUT drives BP_REV_IN of prior FIR unit 72. BP_OUT drives BP_IN of next muxed Hilbert/FIR unit 80, while BP_REV_IN is driven by BP_REV_OUT of next muxed Hilbert/FIR unit 80.

When the band pass FIR filter is accumulating, one of the N tap register values from band pass taps 210 is selected, which is then multiplied by a corresponding one of band pass coefficients 216. The product from multiplier 230 is the band pass output BPF0. BPF0 is then summed with BPF1-3 by adders 64, 66, 68 and accumulated by band pass filter accumulator 214 (FIG. 8).

Since a band pass FIR filter is typically a symmetric function, coefficients that are equidistant on either side of a middle value are identical. Thus the same coefficient value can be used for both the forward path and for the reverse path for each column. Folding the path into a forward path and a reverse path benefits from this symmetry in coefficients since the same coefficient can be applied for both the forward and the reverse paths.

Figure 11:
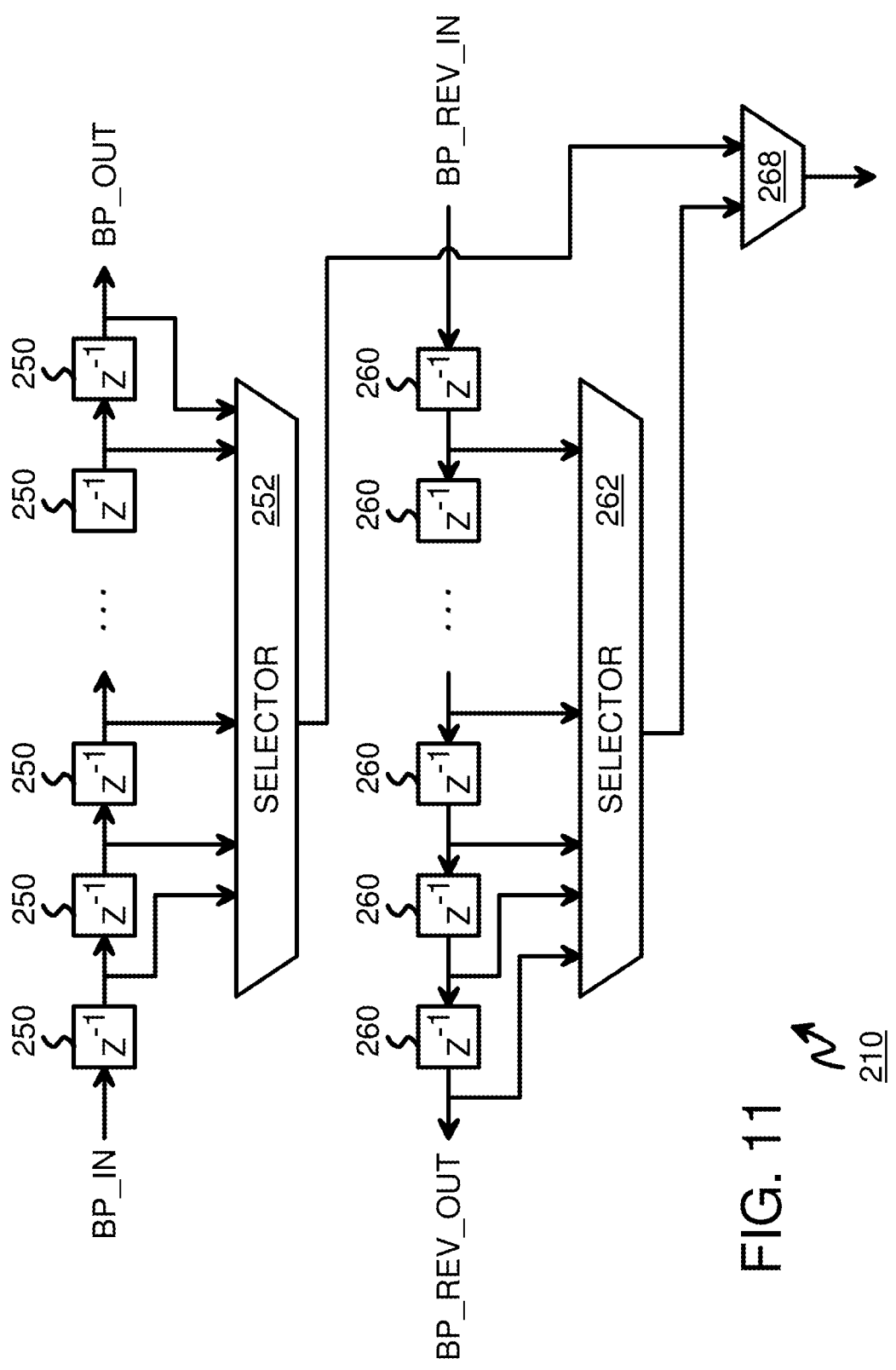
FIG. 11 shows the band pass taps in more detail.

FIG. 11 shows the band pass taps in more detail. Band pass taps 210 have N/2 tap registers 250 in the forward path, forming a delay chain from BP_IN to BP_OUT. Selector 252 selects one of these N/2 delay tap values output by tap registers 250.

Band pass taps 210 also have N/2 tap registers 260 in the reverse path, forming a delay chain from BP_REV_IN to BP_REV_OUT. Selector 252 selects one of these N/2 delay tap values output by tap registers 260. Mux 268 selects either the forward or reverse path for output to shared multiplier 230 (FIG. 10).

Figure 12:
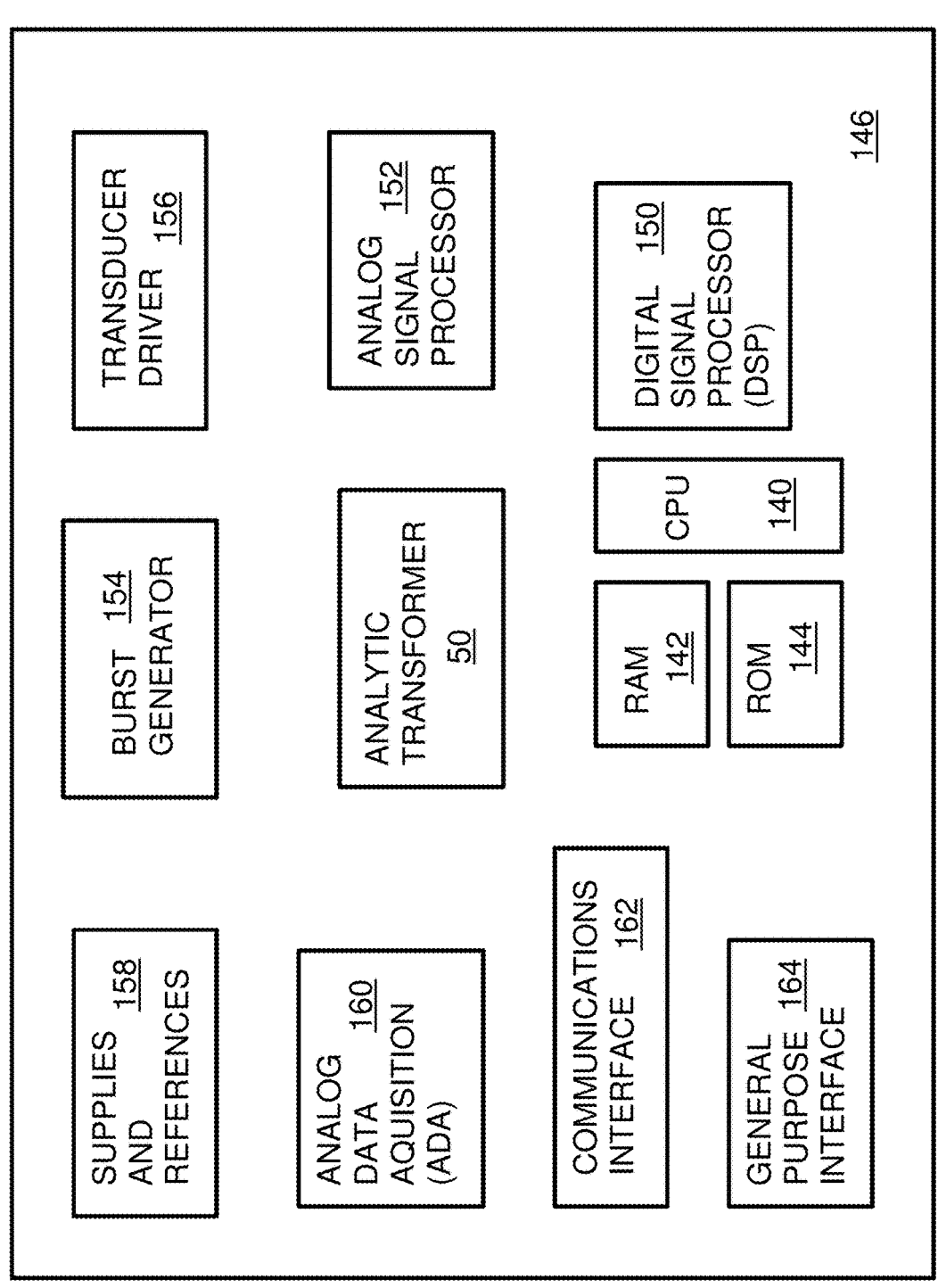
FIG. 12 shows a smart ultrasonic sensor Integrated Circuit (IC).

FIG. 12 shows a smart ultrasonic sensor Integrated Circuit (IC). Ultrasonic sensor IC 146 can replace sensor chip 46 (FIG. 4) in a vehicle. The vehicle has one or more Electronic Control Units (ECU) that may control various operations in the vehicle. One function of the ECU is to control ultrasonic sensor IC 146 to implement parking assist and collision alert.

Ultrasonic sensor IC 146 is an Integrated Circuit (IC) that sends data to and receives commands and data from an external ECU using communication interface 162. Commands can include activating transducer driver 156 to generate ultrasonic wave signals that are coupled to an antenna through a transformer. Some of these ultrasonic wave signals are reflected back by an object near the car (FIG. 1B) to the antenna and detected by the receiver in ultrasonic sensor IC 146.

Burst generator 154 generates a burst of pulses. These burst pulses have an ultrasonic frequency and are applied to transducer driver 156 to drive the antenna to generate the transmitted ultrasonic waveform of FIG. 5A. Supplies and references 158 provide internal power supplies and voltage references, such as used by analog signal processor 152 that can process analog signals received from the antenna. For example, analog signal processor 152 can include an Analog-to-Digital Converter (ADC). These analog signals can be amplified to generate UT_IN that is input to analytic transformer 50. Analytic transformer 50 outputs detected envelope 114 (FIG. 5B). Analog data acquisition 160 acquires the analog signal and may be used for functions other than echo detection.

CPU 140 can execute routines stored in ROM 144 such as to process detected envelope 114, stored in RAM 142, to locate peaks, and compare the time delays from the transmitted burst until the peaks are received. When this time delay is decreasing below a threshold, a parking alert can be activated and sent through communications interface 162 to the ECU, which can generate an audible signal to the driver.

General purpose interface 164 provides an alternate interface that can be used for debugging or development. CPU 140 can perform squaring, summing, and square root functions of absolute unit 58 (FIG. 6), or dedicated hardware can be provided for the absolute operation on the real (I) and imaginary (Q) outputs from analytic transformer 50 (FIG. 8).

Digital Signal Processor (DSP) 150 examines detected envelope 114 to locate peaks and can further process the received signals. The magnitude of the envelope is influenced by the material in the object reflecting the ultrasonic waves, while the arrival time of the echo can be used to calculate or estimate the distance from the car to the object. These more complex processes may be performed by DSP 150. Alternately, for a low-cost ultrasonic sensor IC 146, DSP 150 can be deleted entirely, with the smaller and lower-cost analytic transformer 50 used to generate detected envelope 114.

Figures 13A, 13B:
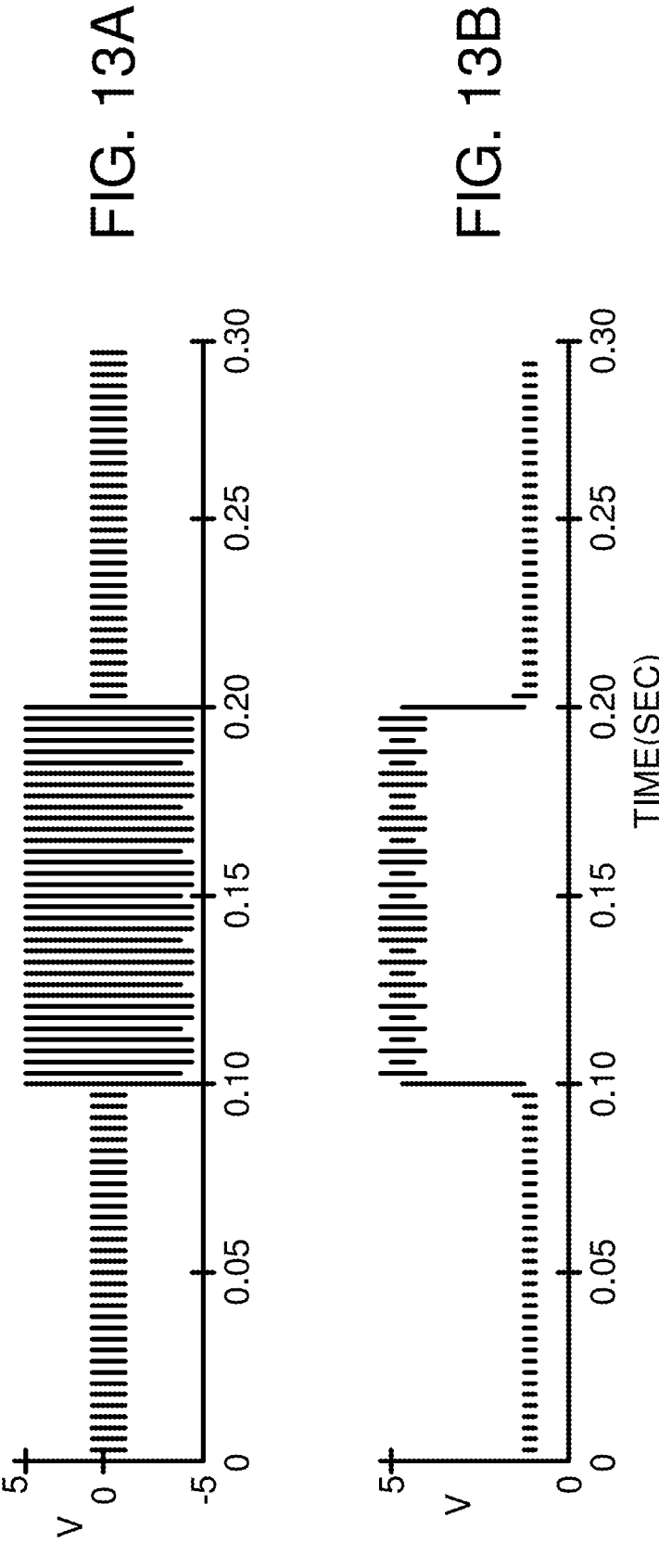
FIGS. 13A-13B show envelope detection using prior-art quadrature detection.

FIGS. 13A-13B show envelope detection using prior-art quadrature detection. In FIG. 13A, the ultrasonic echo signal has a pulse from about 0.1 to 0.2 seconds. In FIG. 13B, the detected envelope signal goes high during this time from 0.1 to 0.2 seconds, but there is significant noise when the detected envelope signal is high. The noise has a Signal-to-Noise (S/N) ratio of about 10.85 dB.

Figures 14A, 14B:
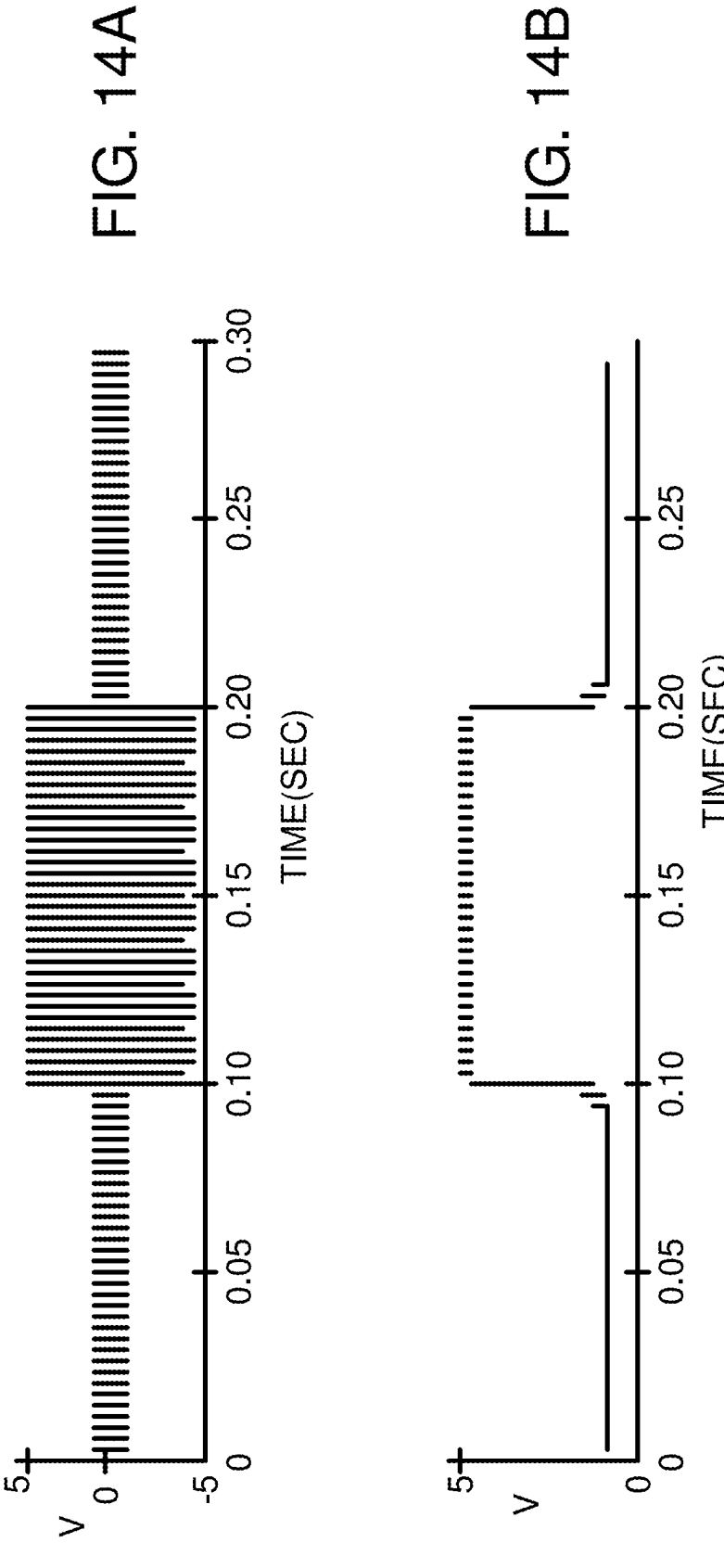
FIGS. 14A-14B show envelope detection using the analytic transform of FIGS. 8-11.

FIGS. 14A-14B show envelope detection using the analytic transform of FIGS. 8-11. In FIG. 14A, the ultrasonic echo signal has a pulse from about 0.1 to 0.2 seconds. In FIG. 14B, the detected envelope signal goes high during this time from 0.1 to 0.2 seconds. The noise has a Signal-to-Noise (S/N) ratio of about 13 dB.

The noise of the detected envelope signal is significantly reduced by about 65% using analytic transformer 50 (FIG. 14B) compared with the prior-art detector of FIG. 13B.

Alternate Embodiments

Several other embodiments are contemplated by the inventors. For example many combinations and variations of the analytic transformer and its control are possible. A shared adder may be used rather than separate adders 64, 66, 68 (FIG. 8). Other shared or time-multiplexed hardware may be used for various functions. For example, band pass filter accumulator 214 and Hilbert accumulator 224 could use the same accumulator hardware, but at different times. Additional delays or buffers may be added, such as an additional register before the input to Hilbert taps 220 or to band pass taps 210. Pipeline registers may be added and operations may be sub-divided using such pipeline registers and faster clocking.

DSP 150 can be a standard DSP with the addition of signal operation units 56 and reconfigure control logic 54 for analytic transformer 50 when analytic transformer 50 is integrated with DSP 150. DSP 150 can be deleted in some embodiments that use only analytic transformer 50.

Rather than measure the time delay of the peak of the echo signal relative to the peak of the transmitted signal, time may be measured to the start of a reflected signal, such as when the echo signal surpasses a threshold value that is high enough to ignore noise. While ultrasonic echo 112 is an analog signal, it is converted to digital before being input to analytic transformer 50 as UT_IN.

Hilbert taps 220 can be constructed in a similar manner to band pass taps 210 (FIG. 11). While tap registers 250, 260 have been shown, they can be implemented as clocked registers that are clocked by the input clock, or by memory locations that are pointed to by pointers that are incremented by the input clock, while the memory values remain in a same physical memory location. The storage elements of the delay lines can be a part of a larger semiconductor memory array or can be smaller storage elements such as flip-flops on a semiconductor Integrated Circuit (IC) such as a Field Programmable Logic Array (FPGA). Coefficient storage may also be portions of a memory array or registers or latches on a semiconductor chip. Some coefficients may be stored off-chip and cached on the local semiconductor memory.

While a single multiplier 230 has been shown for each of FIR unit 70, 72, 74, and muxed Hilbert/FIR unit 80, there could be more multipliers operating in parallel. For example, there could be 2 multipliers 230 (FIG. 10) and band pass taps 210 could select two taps and two different BP coefficients could be selected. The two products from the two multipliers 230 could be summed to generate BPF0. The number of accumulator clock pulses per input clock pulse could be cut in half, resulting in faster processing. A single selector could operate at double frequency, loading each multiplier with a tap value, allowing the multiplier extra time when the selector is faster.

While all three FIR units 70, 72, 74 and muxed Hilbert/FIR unit 80 have been shown with the same number N of taps, muxed Hilbert/FIR unit 80 could have a different number M of taps. M and N can be whole numbers that are multiples of two, such as 32, 64, 128, etc.

Multiple transforms could be performed using different sets of coefficients. For example, the band-pass FIR filter may be performed using a first set of FIR filter coefficients to obtain Y_OUT, then a second pass using a second set of FIR filter coefficients may be performed to adjust Y_OUT before being input to Hilbert taps 220. During each pass, a first Hilbert coefficient could be multiplied by the tap value, and then the same tap value is immediately multiplied by a second Hilbert coefficient from a second set of Hilbert coefficients. Multiple sets of band pass FIR filter coefficients could similarly be applied during each accumulator clock cycle.

The coefficients may be stored and read when needed, and may be altered as conditions change. For example, a different set of FIR coefficients could be used when conditions such as temperature change. The coefficients could be customized according to the signal from burst generator 154.

The Hilbert transform, dating back to 1905, was well described by Morse & Feshbach in their textbook "Methods of Theoretical Physics" in 1953. The Hilbert transform is the convolution of an input function u(t) with a transfer function $h(t)=1/(t\pi)$, which yields the output function $H[u(t)]=PC\int-\infty\infty u(\tau)h(t-\tau)d\tau$. The coefficients values are between −1 and 1.

The Hilbert transform of u can be thought of as the convolution of u(t) with the function h(t)=1/πt, known as the Cauchy kernel. Because 1/t is not integrable across t=0, the integral defining the convolution does not always converge. Instead, the Hilbert transform is defined using the Cauchy principal value (denoted here by p.v.). Alternatively, by changing variables, the principal-value integral can be written explicitly as $$H(u)(t) = \frac{2}{\pi}\lim_{\varepsilon \to 0}\int_{\varepsilon}^{\infty} \frac{u(t-\tau)-u(t+\tau)}{2\tau}d\tau.$$

Figure 3:
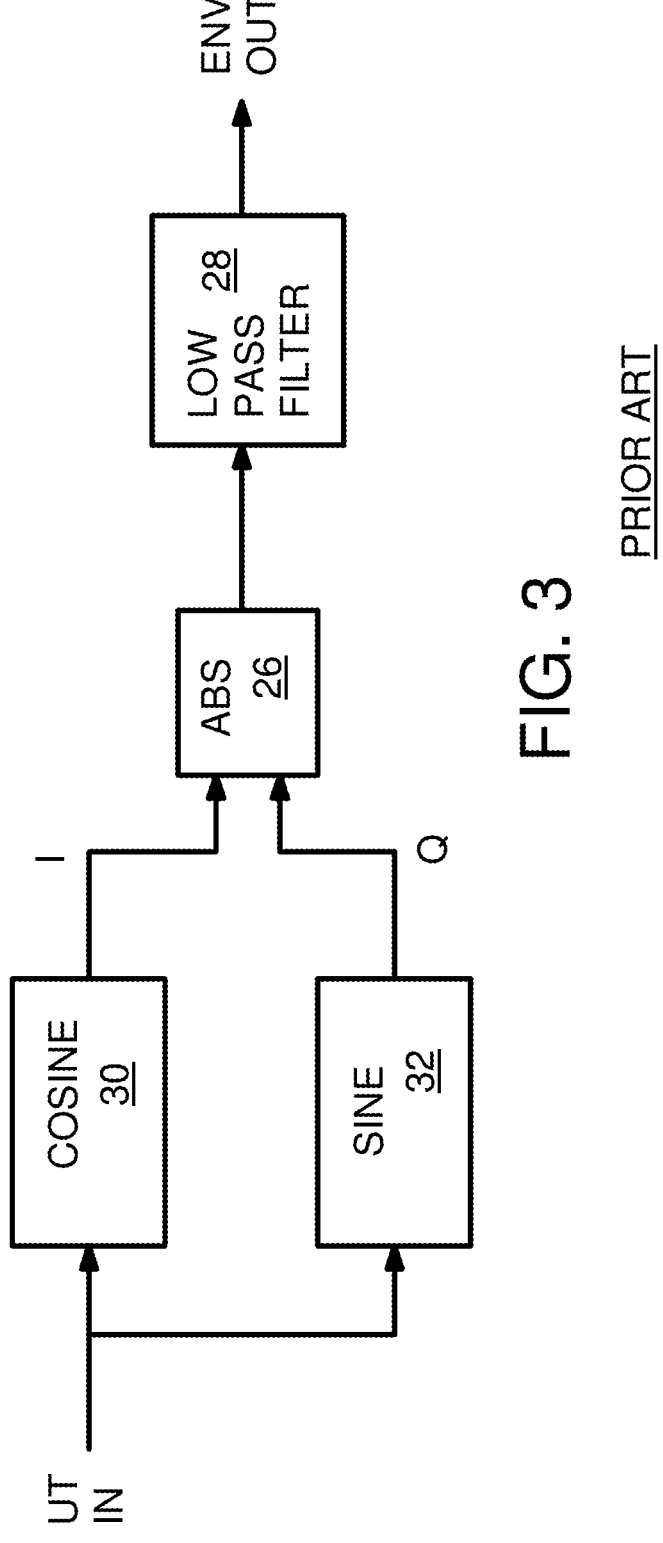
FIG. 3 shows a prior-art envelope detector.

The Hilbert transform introduces a 90-degree phase offset to the quadrature output. The Hilbert transform FIR has an odd number of stages, with delay stage 76 as the center of the FIR. Thus the inline and quadrature outputs have a 90-degree offset, similar to how the sine and cosine have a 90-degree offset in the prior art of FIG. 3. However, complex trigonometric functions such as cosine and sine are not needed with the invention. Thus the invention provides the 90-degree phase shift using a shared multiplier and accumulators without complex trigonometric functions.

There are N taps and N-1 storage elements for a N-th order tapped delay line. The tapped delay lines can have extra storage elements or extra taps that are redundant or not needed or input to the shared multiplier. For example, buffer delay stages could be added to buffer inputs or intermediate values. While a direct form of a FIR filter has been shown, other forms of FIR filters could be substituted, such as a lattice-form FIR filter. Rather than a FIR filter, an Infinite Response Filter (IIR) could be used. Approximations of these filters could also be used.

While the number of taps in the forward path and in the reverse path have been described as equal, they may be equal within a tolerance such as equal within 1 or equal within 10%. For very large values of N, such as N=1024, the FIR filter may produce acceptable results when the forward and reverse paths differ by larger numbers, such as 2-10 more in one path than the other. FIR units 70, 72, 74 do not have to have the same number of taps, and there could be more than four FIR units or less than four. There could be fewer taps for Hilbert taps 220 than for band pass taps 210.

More complex buffers, level shifters, or other components could be substituted or added. Inversions could be added at various locations. Hysteresis of other delays and output wave shaping could be added. Rather than use inverters, other kinds of buffer circuits, selectors, or muxes may be used.

Different transistor, capacitor, resistor, and other device sizes can be used, and various layout arrangements can be used, such as multi-leg, ring, doughnut or irregular-shape transistors. Currents can be positive or negative currents and flow in either direction. Many second and third order circuit effects may be present and may be significant, especially for smaller device sizes. A circuit simulation may be used to account for these secondary factors during design.

Terms such as up, down, above, under, left, right, forward, reverse, horizontal, vertical, inside, outside, are relative and depend on the viewpoint and are not meant to limit the invention to a particular perspective. Devices may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An envelope detector comprising:

a waveform input receiving a digital input waveform having a plurality of values for a plurality of time points;

a Finite-Impulse-Response (FIR) unit having a series of N taps between N-1 storage elements, each storage element being a semiconductor memory for storing a value of the digital input waveform for a successive time point of the digital input waveform;

a coefficient storage in a semiconductor memory for storing a plurality of coefficients;

a shared multiplier for multiplying a selected tap from the series of N taps with a corresponding coefficient to generate a product;

a FIR controller that selects a selected tap in the series of N taps, and that selects the corresponding coefficient from the coefficient storage to apply to the shared multiplier, the FIR controller selecting all of the series of N taps over a cycle of N accumulator time periods;

a band pass filter accumulator for accumulating the product from the shared multiplier generated for each of the N taps to generate a FIR filter output for a time point of the digital input waveform after all N taps have been selected by the FIR controller after the cycle of N accumulator time periods;

a Hilbert unit having a series of M Hilbert taps between M-1 Hilbert storage elements, each Hilbert storage element being a semiconductor memory for storing the FIR filter output generated by the band pass filter accumulator for successive time points;

wherein the FIR filter output generated by the band pass filter accumulator is shifted into an input tap of the series of M Hilbert taps after each cycle of N accumulator time periods;

wherein the shared multiplier is also for multiplying a selected Hilbert tap from the series of M Hilbert taps with a corresponding Hilbert coefficient from the coefficient storage to generate a Hilbert product;

a Hilbert controller that selects a different one of the M Hilbert taps as the selected Hilbert tap, and that selects a different corresponding Hilbert coefficient to apply to the shared multiplier for each of M Hilbert accumulator time periods;

a Hilbert accumulator for accumulating the Hilbert product from the shared multiplier for each of the M Hilbert taps to generate a quadrature output for a time point of the digital input waveform, wherein the Hilbert controller selects all M Hilbert taps during a Hilbert cycle of M Hilbert accumulator time periods;

a midpoint delay stage that receives a middle tap in the M Hilbert taps, the middle tap being separated from the input tap by within 1 of M/2 Hilbert taps in the series of M Hilbert taps, the midpoint delay stage driving a next tap in the series of M Hilbert taps;

wherein the midpoint delay stage generates an inline output; and an absolute unit that receives the inline output from the midpoint delay stage, and that receives the quadrature output from the Hilbert accumulator, the absolute unit squaring the inline output to generate an inline square, the absolute unit squaring the quadrature output to generate a quadrature square, the absolute unit summing the inline square and the quadrature square to generate a sum, the absolute unit outputting a square root of the sum as an envelope value for the time point;

wherein the envelope value for the time point is a point on a detected envelope of the digital input waveform;

wherein M is a whole number that is greater than 4;

wherein N is a whole number that is greater than 8, whereby the shared multiplier is shared by the FIR unit and by the Hilbert unit of the envelope detector.

2. The envelope detector of claim 1 wherein N is at least four times larger than M.

3. The envelope detector of claim 2 wherein N is 128 and M is 32.

4. The envelope detector of claim 2 wherein the shared multiplier further comprises a plurality of X multipliers, wherein X is a whole number of at least 2;

wherein the FIR controller selects X selected taps and X corresponding coefficients that are multiplied by the shared multiplier to generate X products for every N/X accumulator time periods;

wherein N/X is rounded to a whole number;

a product adder for adding the X products to generate a product sum that is input to the band pass filter accumulator;

wherein the band pass filter accumulator accumulates a new product sum from the product adder every N/X accumulator time periods.

5. The envelope detector of claim 4 wherein the series of N taps further comprises a forward path and a reverse path, wherein the waveform input is connected to write a value from the plurality of values into a first tap in the forward path, and wherein a last tap in the forward path is connected to write a shifted value into a first tap in the reverse path;

wherein the forward path has a number of taps that is within 1 of N/2;

wherein the reverse path has a number of taps that is within 1 of N/2;

wherein values stored in the forward path are shifted forward in the forward path and are then shifted in reverse in the reverse path for every new time point of the waveform input shifted in.

6. The envelope detector of claim 5 further comprising:

a first selector mux that selects the selected tap from the series of N taps when the band pass filter accumulator is accumulating, and that selects the selected Hilbert tap from the series of M Hilbert taps when the Hilbert accumulator is accumulating, the first selector mux connected to drive a first input to the shared multiplier;

a second selector mux that selects the corresponding coefficient from the coefficient storage, wherein the corresponding coefficient is a band pass FIR filter coefficient, when the band pass filter accumulator is accumulating, and that selects the corresponding Hilbert coefficient from the coefficient storage, wherein the corresponding Hilbert coefficient is a Hilbert transform coefficient, when the Hilbert accumulator is accumulating, the second selector mux connected to drive a second input to the shared multiplier.

7. The envelope detector of claim 6 further comprising:

an Analog-to-Digital Converter (ADC) that receives an analog signal from an antenna, the analog signal being an ultrasonic echo waveform of an ultrasonic pulse reflected back from an external object, the ADC generating the digital input waveform having the plurality of values for the plurality of time points that is applied to the waveform input.

8. The envelope detector of claim 7 wherein the envelope detector is mounted on a moving vehicle and the external object is external to the moving vehicle.

9. An ultrasonic-echo envelope detector comprising:

an Analog-to-Digital Converter (ADC) that receives an analog signal from an antenna, the analog signal being an ultrasonic echo waveform of an ultrasonic pulse reflected back from an external object, the ADC generating a digital input waveform having a plurality of input values for a plurality of time points;

an analytic transformer having a reconfigurable signal operation unit that band-pass filters the digital input waveform to generate a filtered value for each of the plurality of timepoints, and that performs a Hilbert transform on a series of the filtered value to generate an inline output and a quadrature output;

wherein the reconfigurable signal operation unit performs both a band pass filter and the Hilbert transform for each input value in the plurality of timepoints;

reconfigurable control logic for controlling the reconfigurable signal operation unit to perform the band pass filter on the digital input waveform and to perform the Hilbert transform on a series of the filtered value to generate an inline output and a quadrature output;

a coefficient storage for storing a plurality of filter coefficients that are applied to the reconfigurable signal operation unit when performing the band pass filter, and for storing a plurality of Hilbert coefficients that are applied to the reconfigurable signal operation unit when performing the Hilbert transform;

wherein the coefficient storage includes a semiconductor memory; and an absolute generator that receives the inline output and the quadrature output generated by the Hilbert transform, the absolute generator calculating an absolute value of a sum of squares of the inline output and the quadrature output, the absolute generator outputting the absolute value as a detected envelope value for a current time point is a point on a detected envelope of the digital input waveform;

wherein the detected envelope value represents an envelope enclosing peaks of the analog signal.

10. The ultrasonic-echo envelope detector of claim 9 further comprising:

a tapped delay line having N-1 storage elements that are between N taps, wherein the digital input waveform is shifted into and through the tapped delay line;

a Hilbert tapped delay line having M-1 storage elements that are between M taps, wherein the filtered value generated by the band pass filter is shifted into and through the Hilbert tapped delay line;

a Hilbert middle delay element coupled between middle taps in the Hilbert tapped delay line, wherein the middle taps have H1 taps before and H2 taps after in the Hilbert tapped delay line;

wherein M is a whole number;

wherein N is a whole number that is at least double M;

wherein H1 is a whole number within 2 of M/2;

wherein H2 is a whole number within 2 of M/2.

11. The ultrasonic-echo envelope detector of claim 10 wherein the storage elements are shift registers or memory locations in a semiconductor memory array.

12. The ultrasonic-echo envelope detector of claim 10 further comprising:

a shared multiplier, in the reconfigurable signal operation unit, the shared multiplier multiplying a tap value from the tapped delay line with a filter coefficient from the coefficient storage while performing the band pass filter, and the shared multiplier multiplying a Hilbert tap value from the Hilbert tapped delay line with a Hilbert coefficient from the coefficient storage when performing the Hilbert transform;

wherein the Hilbert tap value is selected from the Hilbert tapped delay line that is loaded with the filtered value generated by the band pass filter;

whereby the shared multiplier performs both band pass filtering and the Hilbert transform.

13. The ultrasonic-echo envelope detector of claim 12 further comprising:

a tap selector that selects the tap value and sends the tap value to the shared multiplier from the tapped delay line when the shared multiplier is generating the filtered value, and that selects the Hilbert tap value and sends the Hilbert tap value to the shared multiplier when the shared multiplier is generating the quadrature output;

a coefficient selector, coupled to the coefficient storage, that selects the filter coefficient to send to the shared multiplier when the shared multiplier is generating the filtered value, and that selects the Hilbert coefficient to send to the shared multiplier when the shared multiplier is generating the quadrature output.

14. The ultrasonic-echo envelope detector of claim 13 further comprising:

a band pass filter accumulator that receives and accumulates products generated by the shared multiplier when generating the filtered value, wherein the band pass filter accumulator outputs the filtered value after all N taps have been multiplied by filter coefficients by the shared multiplier and accumulated into the band pass filter accumulator.

15. The ultrasonic-echo envelope detector of claim 14 further comprising:

a Hilbert accumulator that receives and accumulates products generated by the shared multiplier when generating the quadrature output, wherein the Hilbert accumulator outputs the quadrature output after all M Hilbert tap values have been multiplied by Hilbert coefficients by the shared multiplier and accumulated into the Hilbert accumulator.

16. The ultrasonic-echo envelope detector of claim 15 wherein the filter coefficient is a Finite-Impulse-Response (FIR) coefficient and the band pass filter is a FIR filter.

17. A reconfigurable envelope detector comprising:

a waveform input receiving a digital waveform;

a filter coefficient storage for storing band pass filter coefficients in a solid-state memory;

a Hilbert filter coefficient storage for storing Hilbert filter coefficients in a solid-state memory;

a first Finite-Impulse-Response (FIR) unit that comprises:

a first forward tapped delay line between a first forward input and a first forward output;

wherein the first forward input receives the digital waveform from the waveform input;

a first reverse tapped delay line between a first reverse input and a first reverse output;

a first tap selector that selects a first selected tap from the first forward tapped delay line or from the first reverse tapped delay line;

a first filter coefficient selector that selects a first filter coefficient from the filter coefficient storage;

a first multiplier that multiplies the first selected tap with the first filter coefficient to generate a first product;

a second FIR unit that comprises:

a second forward tapped delay line between a second forward input and a second forward output;

a second reverse tapped delay line between a second reverse input and a second reverse output;

wherein the second forward input receives the first forward output;

wherein the second reverse output drives the first reverse input;

a second tap selector that selects a second selected tap from the second forward tapped delay line or from the second reverse tapped delay line;

a second filter coefficient selector that selects a second filter coefficient from the filter coefficient storage;

a second multiplier that multiplies the second selected tap with the second filter coefficient to generate a second product;

a third FIR unit that comprises:

a third forward tapped delay line between a third forward input and a third forward output;

a third reverse tapped delay line between a third reverse input and a third reverse output;

wherein the third forward input receives the second forward output;

wherein the third reverse output drives the second reverse input;

a third tap selector that selects a third selected tap from the third forward tapped delay line or from the third reverse tapped delay line;

a third filter coefficient selector that selects a third filter coefficient from the filter coefficient storage;

a third multiplier that multiplies the third selected tap with the third filter coefficient to generate a third product;

a muxed FIR/Hilbert unit that comprises:

a fourth forward tapped delay line between a fourth forward input and a fourth forward output;

a fourth reverse tapped delay line between a fourth reverse input and a fourth reverse output;

wherein the fourth forward input receives the third forward output;

wherein the fourth reverse output drives the third reverse input;

wherein the fourth forward output drives the fourth reverse input;

a fourth tap selector that selects a fourth selected tap from the fourth forward tapped delay line or from the fourth reverse tapped delay line;

a fourth filter coefficient selector that selects a fourth filter coefficient from the filter coefficient storage;

a shared multiplier that multiplies the fourth selected tap with the fourth filter coefficient to generate a fourth product;

a Hilbert forward tapped delay line between a Hilbert forward input and a Hilbert forward output;

a Hilbert reverse tapped delay line between a Hilbert reverse input and a Hilbert reverse output;

wherein the Hilbert forward input receives a filter result;

a Hilbert delay stage that receives the Hilbert forward output and drives the Hilbert reverse input with an inline output generated by the Hilbert delay stage;

a Hilbert tap selector that selects a Hilbert selected tap from the Hilbert forward tapped delay line or from the Hilbert reverse tapped delay line;

a Hilbert filter coefficient selector that selects a Hilbert filter coefficient from the Hilbert filter coefficient storage;

wherein the shared multiplier also multiplies the Hilbert selected tap with the Hilbert filter coefficient to generate a Hilbert product;

a filter product summer that generates a product sum of the first product, the second product, the third product, and the fourth product;

a band pass filter accumulator that accumulates the product sum from the filter product summer to generate the filter result after the first tap selector has selected all taps in the first forward tapped delay line and in the first reverse tapped delay line;

a Hilbert accumulator that accumulates the Hilbert product to generate a quadrature output after the Hilbert tap selector has selected all Hilbert taps in the Hilbert forward tapped delay line and in the Hilbert reverse tapped delay line;

an absolute generator that combines the inline output and the quadrature output to generate an envelope value for the digital waveform.

18. The reconfigurable envelope detector of claim 17 wherein the absolute generator further comprises an arithmetic unit that squares the inline output to generate an inline square, and squares the quadrature output to generate a quadrature square, and that sums the inline square and the quadrature square to generate a combined sum, and that generates a square root of the combined sum to generate the envelope value.

19. The reconfigurable envelope detector of claim 17 wherein the Hilbert forward tapped delay line has M1 taps and M1 storage elements;

wherein the Hilbert reverse tapped delay line has M2 taps and M2-1 storage elements;

wherein M is M1+M2 and M1 and M2 are equal or differ by 1, and M, M1, and M2 are whole numbers;

wherein the first, second, third, and fourth forward tapped delay line each has N1 taps and N1 storage elements;

wherein the first, second, third, and fourth reverse tapped delay line each has N2 taps and N2-1 storage elements;

wherein N is N1+N2 and N1 and N2 are equal or differ by 1, and N, N1, and N2 are whole numbers.

20. The reconfigurable envelope detector of claim 19 wherein N is four times M.

* * * * *